(12) United States Patent
Aldersley et al.

(10) Patent No.: US 8,123,277 B2
(45) Date of Patent: Feb. 28, 2012

(54) MOTOR VEHICLE

(75) Inventors: Nicholas Aldersley, Hebertshausen (DE); Michael Rodewald, Greenville, SC (US); Achim Dockweiler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/709,876

(22) Filed: Feb. 22, 2010

(65) Prior Publication Data

US 2010/0207423 A1 Aug. 19, 2010

Related U.S. Application Data

(63) Continuation of application No. PCT/EP2008/006391, filed on Aug. 2, 2008.

(30) Foreign Application Priority Data

Aug. 23, 2007 (DE) .................. 10 2007 039 808

(51) Int. Cl.
*B60J 5/10* (2006.01)
(52) U.S. Cl. .................. 296/146.9; 296/146.8
(58) Field of Classification Search ............... 296/146.8, 296/146.11, 146.2, 146.9, 50, 106, 56
See application file for complete search history.

(56) References Cited

U.S. PATENT DOCUMENTS

| | | | |
|---|---|---|---|
| 4,664,437 A | 5/1987 | Queveau | |
| 6,003,931 A * | 12/1999 | Dancasius et al. | 296/146.8 |
| 6,203,094 B1 | 3/2001 | Lee | |
| 6,220,649 B1 * | 4/2001 | Rife | 296/146.12 |
| 6,659,538 B2 | 12/2003 | Scheid | |
| 7,503,619 B2 * | 3/2009 | Werner | 296/146.8 |

FOREIGN PATENT DOCUMENTS

| | | |
|---|---|---|
| DE | 43 10 494 A1 | 10/1994 |
| DE | 196 35 873 A1 | 3/1998 |
| DE | 199 57 759 A1 | 11/2000 |
| DE | 101 43 643 A1 | 4/2003 |
| DE | 10 2005 033 098 A1 | 1/2007 |
| EP | 0 200 649 A1 | 12/1986 |
| EP | 1 120 303 A1 | 8/2001 |
| EP | 1 457 373 A1 | 9/2004 |
| EP | 1 574 374 A2 | 9/2005 |

OTHER PUBLICATIONS

German Office Action dated Apr. 16, 2008 with English translation (eight (8) pages).
International Search Report dated Dec. 18, 2008 with English translation (six (6) pages).

\* cited by examiner

*Primary Examiner* — Dennis Pedder
*Assistant Examiner* — Melissa A Black
(74) *Attorney, Agent, or Firm* — Crowell & Moring LLP

(57) ABSTRACT

A pivotable tailgate for a motor vehicle includes pivot arms disposed as one piece on the tailgate body at a distance from one another. At an upper end of each pivot arm, a respective hinge arm is provided, each of which is mounted in a roof section of the body so that there is sealing between an upper tailgate section, a tailgate body, and a tailgate opening via a single encircling seal disposed at the tailgate opening, without additional sealing of the respective pivot arms being required.

29 Claims, 18 Drawing Sheets

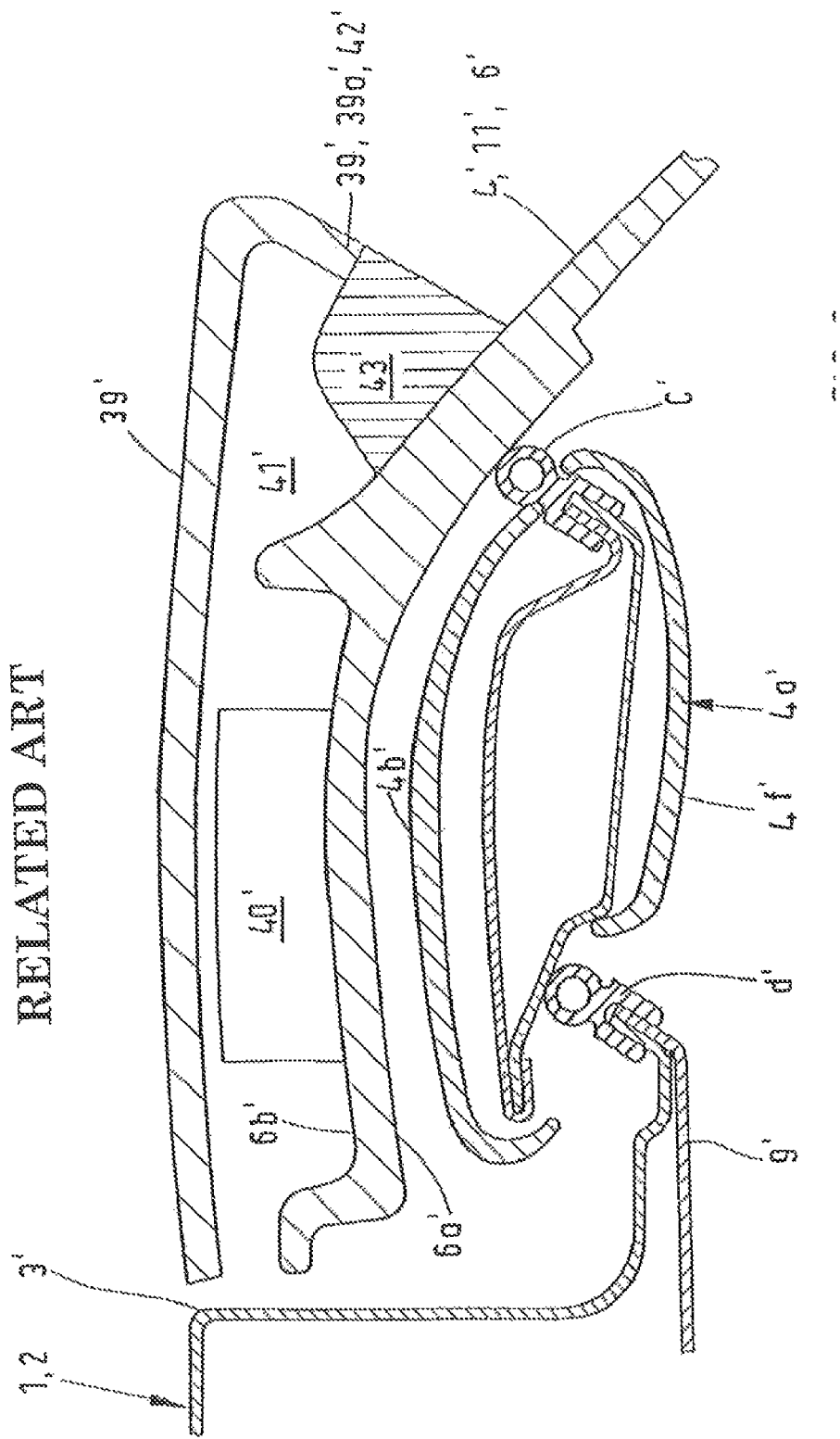

MOTOR VEHICLE

CROSS-REFERENCE TO RELATED APPLICATIONS

This application is a continuation of PCT International Application No. PCT/EP2008/006391, filed Aug. 2, 2008, which claims priority under 35 U.S.C. §119 from German Patent Application No. DE 10 2007 039 808.7, filed Aug. 23, 2007, the entire disclosures of which are herein expressly incorporated by reference.

BACKGROUND AND SUMMARY OF THE INVENTION

The invention relates to a motor vehicle having a body, and a tailgate opening formed in the body, in which a tailgate is disposed such that it can be pivoted on a roof section of the body. The tailgate includes a tailgate body and an upper tailgate section with a rear window pane.

A motor vehicle is already known in which, in a body of the motor vehicle, a tailgate opening is formed. A tailgate is disposed in the tailgate opening, which tailgate can be pivoted upwards. Furthermore, it is known that in the tailgate a rear window pane is disposed, which can be pivoted separately with respect to a tailgate body.

The known tailgate includes an encircling edge on which an encircling or surrounding tailgate seal is disposed. In the closed position, the tailgate seal is abutted by a corresponding bearing surface formed on the tailgate. The tailgate includes a tailgate window opening with an encircling frame. In the frame a seal is also disposed, which is abutted by an encircling edge of the rear window.

Thus, for sealing the known tailgate, an encircling seal between the tailgate and the tailgate opening and an encircling seal between the rear window pane and the tailgate are required.

From DE 196 35 873 A1, a pivotable or displaceable tailgate of a motor vehicle is known, where in said tailgate, through the use of materials with a low weight and through a corresponding fashioning of the inner and outer skin of the tailgate, the weight is reduced. The known tailgate has a closed supporting frame that absorbs the loads which occur. On the supporting frame the inner and outer skin are disposed. The supporting frame includes bars which run in a U-shape primarily in the area of a rear pane. The U-shape results from an upper bar running transversely and lateral bars connecting thereto. Connecting to the two lateral bars are bars which extend at an obtuse angle from a lower edge of the rear pane up to a latch so that a V-shape results. The known, closed supporting frame is shaped in the form of a pentagon.

It is the object of the invention to provide a motor vehicle in which the design of a tailgate is simplified.

This object is realized by a motor vehicle having a body, and a tailgate opening formed in the body, in which a tailgate is disposed such that it can be pivoted on a roof section of the body. The tailgate includes a tailgate body and an upper tailgate section with a rear window pane. A seal is disposed on the tailgate opening for sealing the tailgate. Pivot arms are disposed as one piece on the tailgate body at a distance from one another. At an upper end of each pivot arm a respective hinge arm is provided, each of which is mounted in a roof section of the body, so that there is sealing between the upper tailgate section, the tailgate body and the tailgate opening via a single encircling seal disposed at the tailgate opening, without additional sealing of the respective pivot arms being required.

In a motor vehicle according to an exemplary embodiment of the invention, in a tailgate opening which is formed in a body, a tailgate is disposed in such a manner that it can be pivoted on a roof section of the body. The tailgate includes a tailgate body and a rear window pane disposed thereon. At least one seal is fastened on the tailgate opening for sealing the tailgate. On the tailgate body, pivot arms are disposed as one piece at a distance from one another. At an upper end of each pivot arm a respective hinge arm is provided, each of which is mounted in a roof section of the body. In this way there is advantageously a sealing, without the respective pivot arms, between the upper tailgate section, the tailgate body, and the tailgate opening, via a single encircling seal disposed on the tailgate opening.

An additional seal running approximately in a straight line is provided between a lower edge section of the rear window pane and an upper edge section of the tailgate body.

Through the construction mode, it is advantageously possible that, below an upper section of the rear window pane, components, such as, for example, an antenna amplifier and/or a brake light can be fastened in the dry interior of the vehicle.

Furthermore, it is advantageously possible that, disposed in a cavity of the roof section and provided for pivoting the rear window pane and the tailgate body, hinge drives are in the dry interior of the vehicle. In this way, these components need no watertight seal as in the state of the art.

Inner faces of the encircling seal, each inner face pointing towards the tailgate opening, bound a loading width B of the tailgate opening. Through this mode of construction, it is advantageously possible to increase the loading width B, at least in the area of the rear window pane.

In an advantageous embodiment, pivot arms are disposed at a distance from one another as one piece on the tailgate body. At the upper end of each pivot arm a respective hinge arm is provided, each of which is mounted in a roof section of the body.

In an advantageous embodiment, the rear window pane is mounted in such a manner that it can be pivoted in a roof section of the body via hinge arms at a distance from one another.

In the tailgate opening an encircling seal is advantageously provided in the tailgate opening.

In an advantageous embodiment, the encircling seal is abutted by the upper edge section of the rear window pane and lateral edge sections of the rear window pane in the closed position of the tailgate.

A lower area of the encircling seal is advantageously abutted by lateral edge sections and a lower edge section of the tailgate body, the lower edge section running approximately horizontally in the transverse direction y of the vehicle.

Advantageously, on an upper edge section of the tailgate body and running approximately horizontally in the transverse direction y of the vehicle, a seal is disposed which serves for sealing a lower edge section of the rear window pane.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2a is a sectional view along the line II-II in FIG. 1 showing the arrangement of an upper end section of a known tailgate on a roof section of a tailgate opening;

DETAILED DESCRIPTION OF THE DRAWINGS

Figure 1:
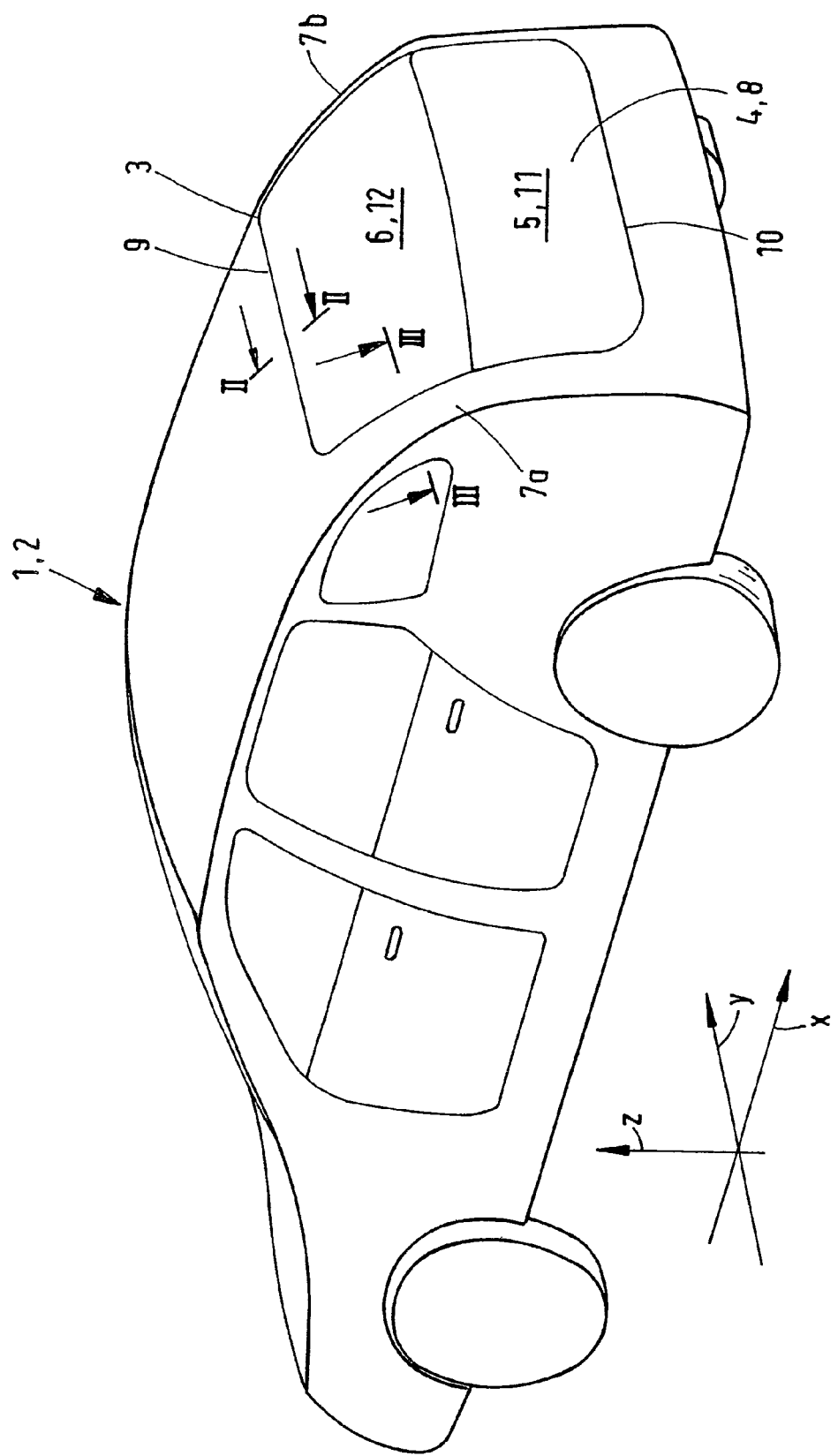
FIG. 1 shows a perspective view of a rear area of a motor vehicle.

FIG. 1 shows a motor vehicle 1, which includes a body 2 provided with a tailgate opening 3 in which a tailgate 4 is disposed. The tailgate 4 includes a tailgate body 5 and a rear window pane 6. The tailgate opening 3 is encircled by two opposing body pillars 7a, 7b, a roof section 9, and a trunk floor section 10. FIG. 1 shows the tailgate 4 in a closed position 8 in which the tailgate body 5 and the rear window 6 are each in the closed position 11, 12.

Figure 2B:
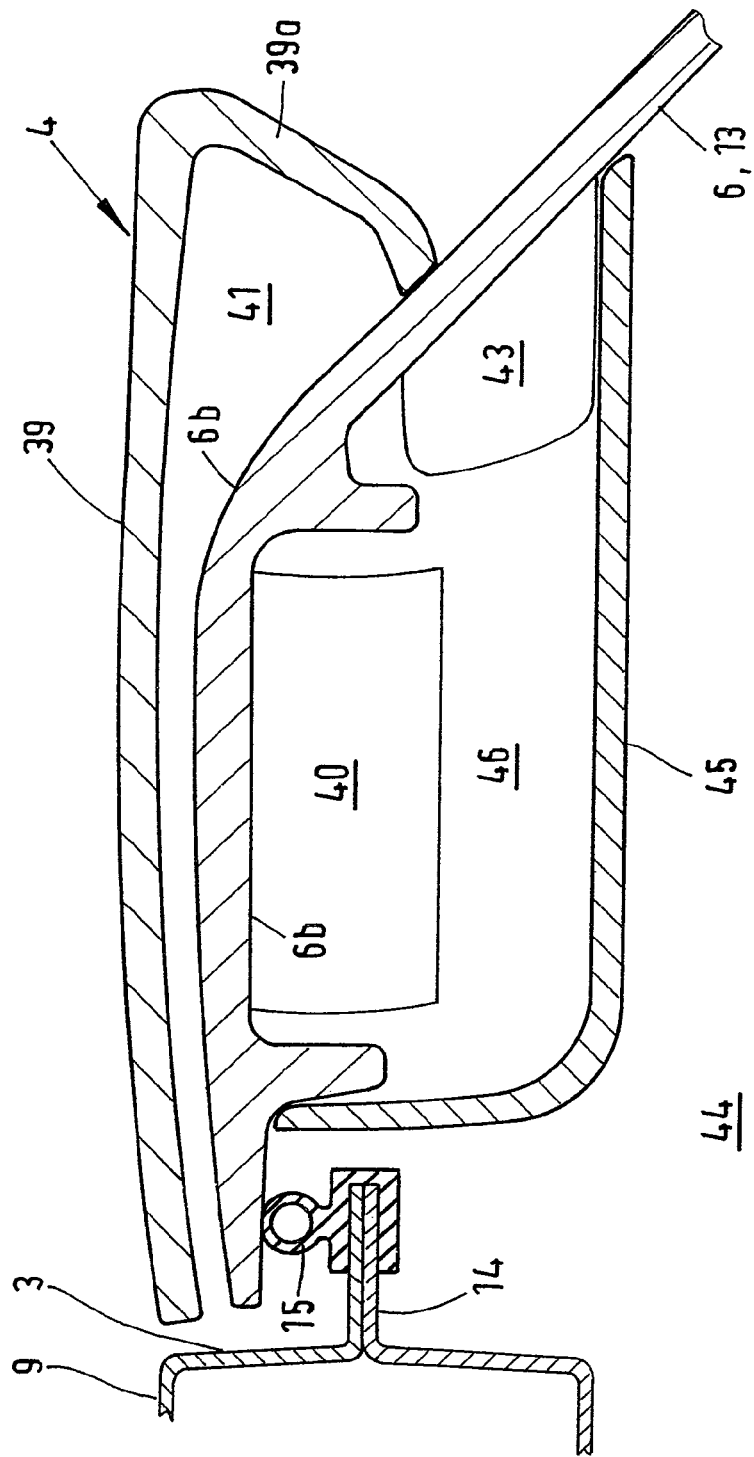
FIG. 2b is a sectional view along the line II-II in FIG. 1 showing the arrangement of an upper end section of a tailgate according to an embodiment of the invention on a roof section of a tailgate opening.
Figure 3A:
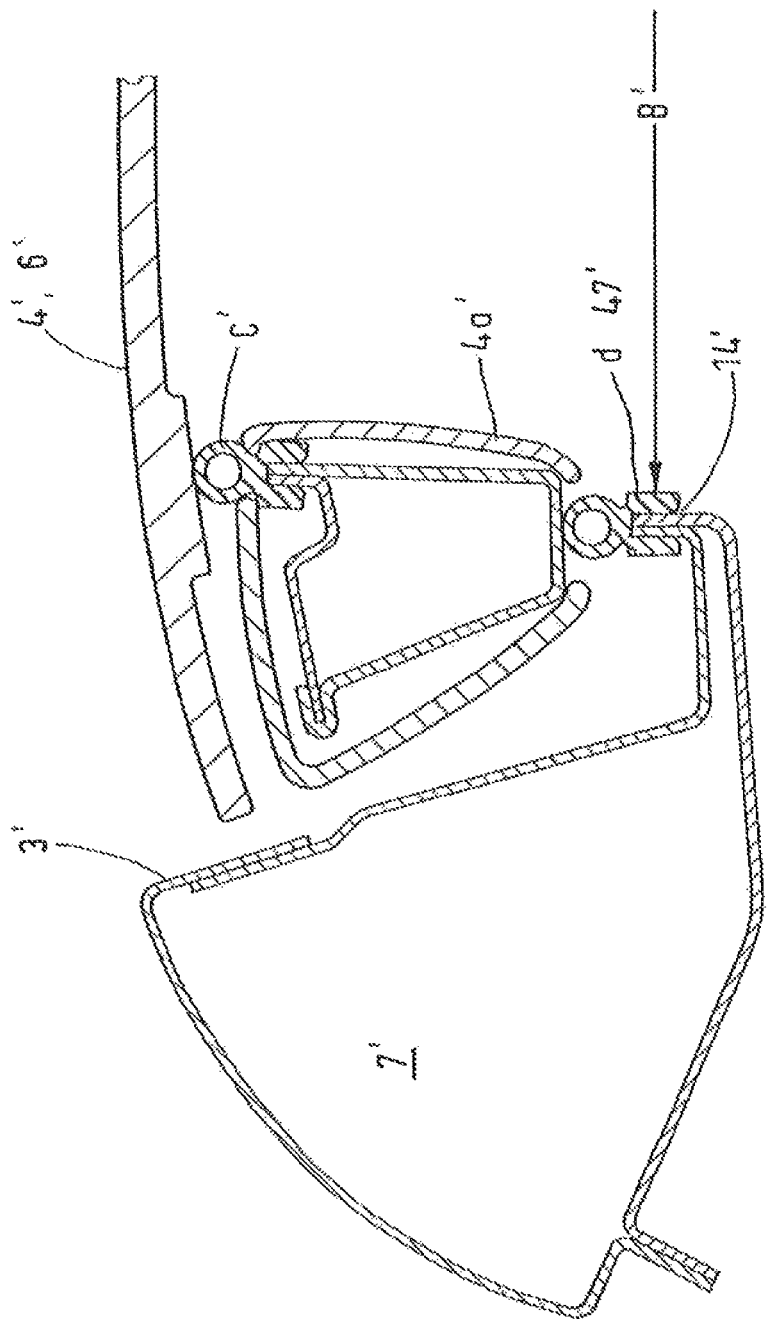
FIG. 3a is a sectional view along the line III-III in FIG. 1 showing, for a closed, known tailgate, the arrangement of a lateral end area of a rear window at the tailgate opening.
Figure 3B:
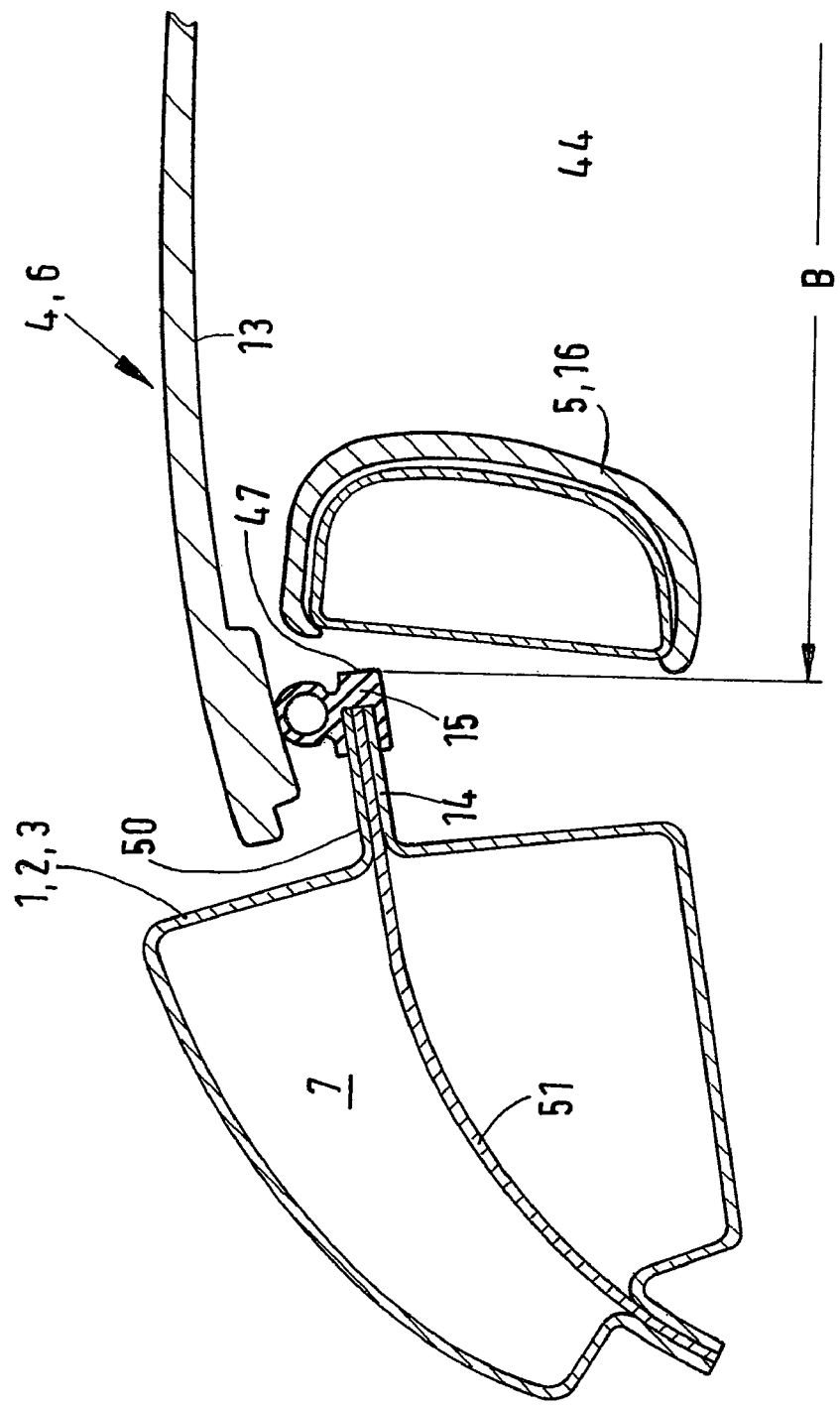
FIG. 3b is a sectional view along the line III-III in FIG. 1 showing in a closed tailgate according to an embodiment of the invention the arrangement of a lateral end area of a rear window at the tailgate opening.

FIGS. 2a and 3a shows sectional views of a known tailgate arrangement and FIGS. 2b and 3b show sectional views of a tailgate arrangement according to an embodiment of the invention. The different design and the different sealing in the tailgate opening of the known tailgate arrangement and the tailgate arrangement according to the embodiment of the invention follow from a comparison of FIGS. 2a and 3a with FIGS. 2b and 3b.

FIG. 2a shows a known tailgate 4', which is in a closed position 11' in a tailgate opening 3'. The known tailgate 4' includes an upper, U-shaped frame section 4a', which is disposed on a tailgate body. Between an upper side 4b' of the frame section 4a' and a lower side 6a' of the rear window pane 6' a seal c' is disposed. Furthermore, an additional seal d' is disposed between a lower side 4f of the U-shaped frame section 4a' and a roof section 9' of the body 2'.

In the form of embodiment shown, a spoiler, a trim piece, or the like 39' is disposed above an upper section 6b' of the rear window pane 6'. In a cavity 41' formed between the rear window pane 6' and the trim piece 39', an electronic component, such as, for example, an antenna amplifier 40', is fastened on the upper section 6b' so as to be watertight. At an edge section 39a' of the trim piece 39', which edge section faces away from the body 2', a brake light 43' is disposed in a recess 42' of the edge section 39a' so as to be watertight, i.e., in a watertight embodiment, between the edge section 39a' and the rear window pane 6'.

In the tailgate 4 according to an embodiment of the invention and shown in FIG. 2b, a single seal 15 is disposed in the tailgate opening 3 between a lower side 13 of the rear window pane 6 and a flange 14 of the roof section 9.

Between the rear window pane 6 and a trim piece 45 pointing towards an interior space 44 of the vehicle, a cavity 46 is formed. In the cavity 46, an electronic component, such as, for example, an antenna amplifier 40, and a brake light 43 are fastened on the upper section 6b of the rear window pane 6. The two components 40, 43 need no watertight seal since the two components 40, 43 are located in the dry interior 44 of the vehicle.

FIG. 3a shows a sectional view of the tailgate 4' represented in FIG. 2a in the area of a rear body pillar 7'. Between the rear window pane 6' and the U-shaped frame section 4a', which is formed as one piece on a tailgate body, the seal c' is disposed. Furthermore, between the lateral, downward running section of the U-shaped frame section 4a' and, lying opposite to it, a flange 14' of the body pillar 7', the seal d' is provided.

Inner faces 47' of the opposing seals d', each inner face pointing towards the tailgate opening 3', bound a loading width B' of the tailgate opening 3'.

By contrast, in the tailgate 4 according to an embodiment of the invention and represented in FIG. 3b, only a single seal 15 is provided between the lower side 13 and the flange 14 on the body pillar 7. Below the rear window pane 6 and at a distance from the body pillar 7, a pivot arm 16 is represented in FIG. 3b. The pivot arm is formed as one piece on the tailgate body 5.

Inner faces 47 of the opposing seals 15, each inner face pointing towards the tailgate opening 3, bound a loading width B of the tailgate opening 3.

Figure 4:
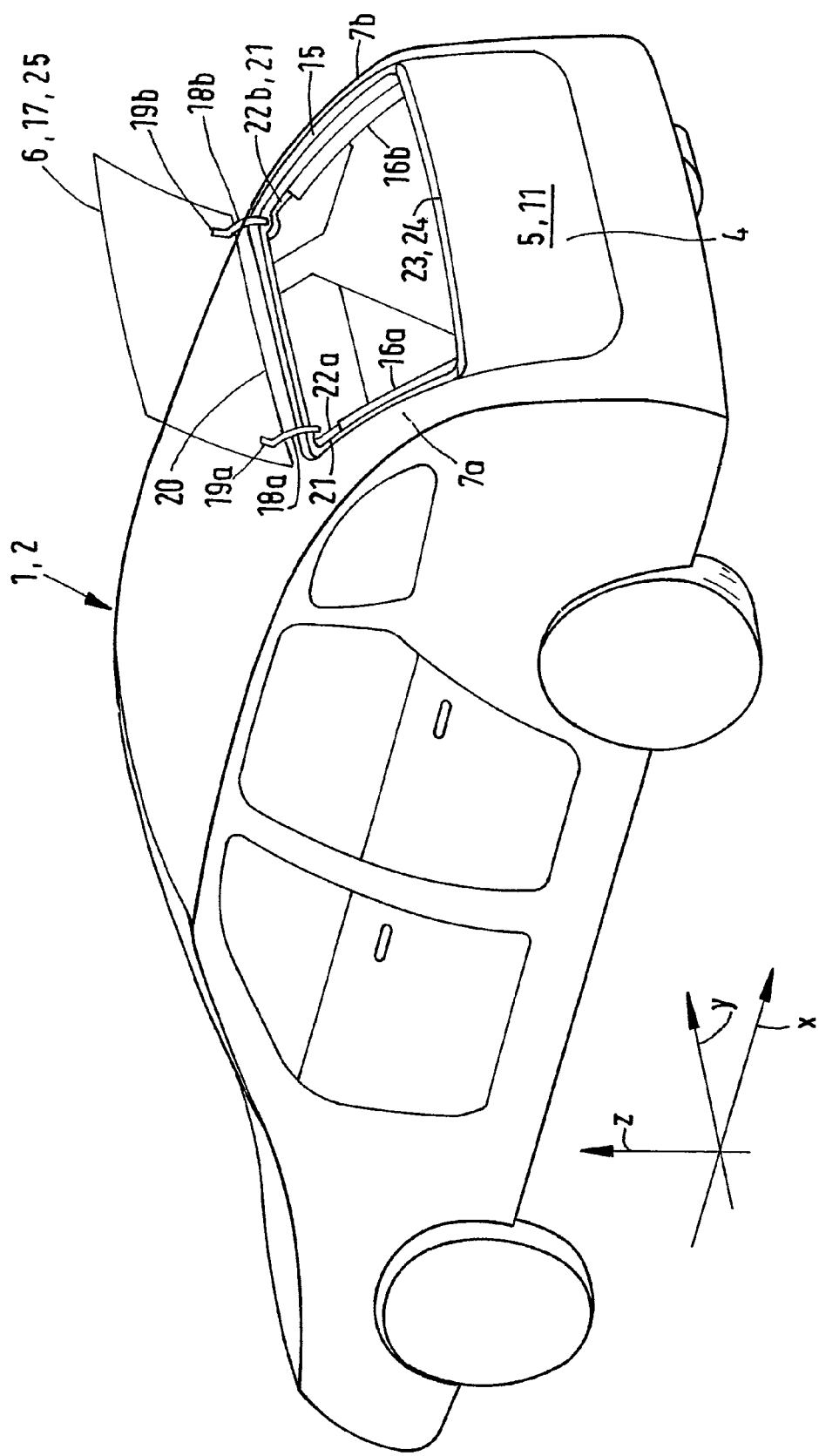
FIG. 4 is a perspective view of a rear area of the motor vehicle shown in FIG. 1, where in said perspective view a lower tailgate section according to an embodiment of the invention is in the closed state and the rear window is in an opened state.

FIG. 4 shows an opened position 17 of the rear window pane 6 while the tailgate body 5 is in the closed position 11. The rear window pane 6 can be pivoted, via two hinge arms 18a, 18b located at a distance from one another, about a horizontal axis running in the transverse direction y of the vehicle.

An end 19a, 19b of the respective hinge arm 18a, 18b is fastened on an upper edge area 20 of the rear window pane 6. Not represented but lying opposite thereto, a respective end of the respective hinge arm 18a, 18b is mounted in a cavity (not shown) in such a manner that it can be displaced and pivoted via a hinge drive 30a and 30b (see FIG. 6) in the roof section 9 of the body 2.

In FIG. 4, the two pivot arms 16a and 16b disposed on the tailgate body 5 can furthermore be seen. At an upper, free end 21 of the pivot arms 16, hinge arms 22a and 22b are disposed. The hinge arms 22a and 22b are also mounted in the not visible cavity in the roof section 9 in such a manner that they can be displaced and pivoted via a hinge drive 32a and 32b (see FIG. 7).

Furthermore, in FIG. 4 an additional seal 23 is represented, which is disposed on an upper edge section 24 of the tailgate body 5. The seal 23 serves for sealing between a lower edge section 25 of the rear window pane 6 and the upper edge section 24 of the tailgate body 5.

Figure 5:
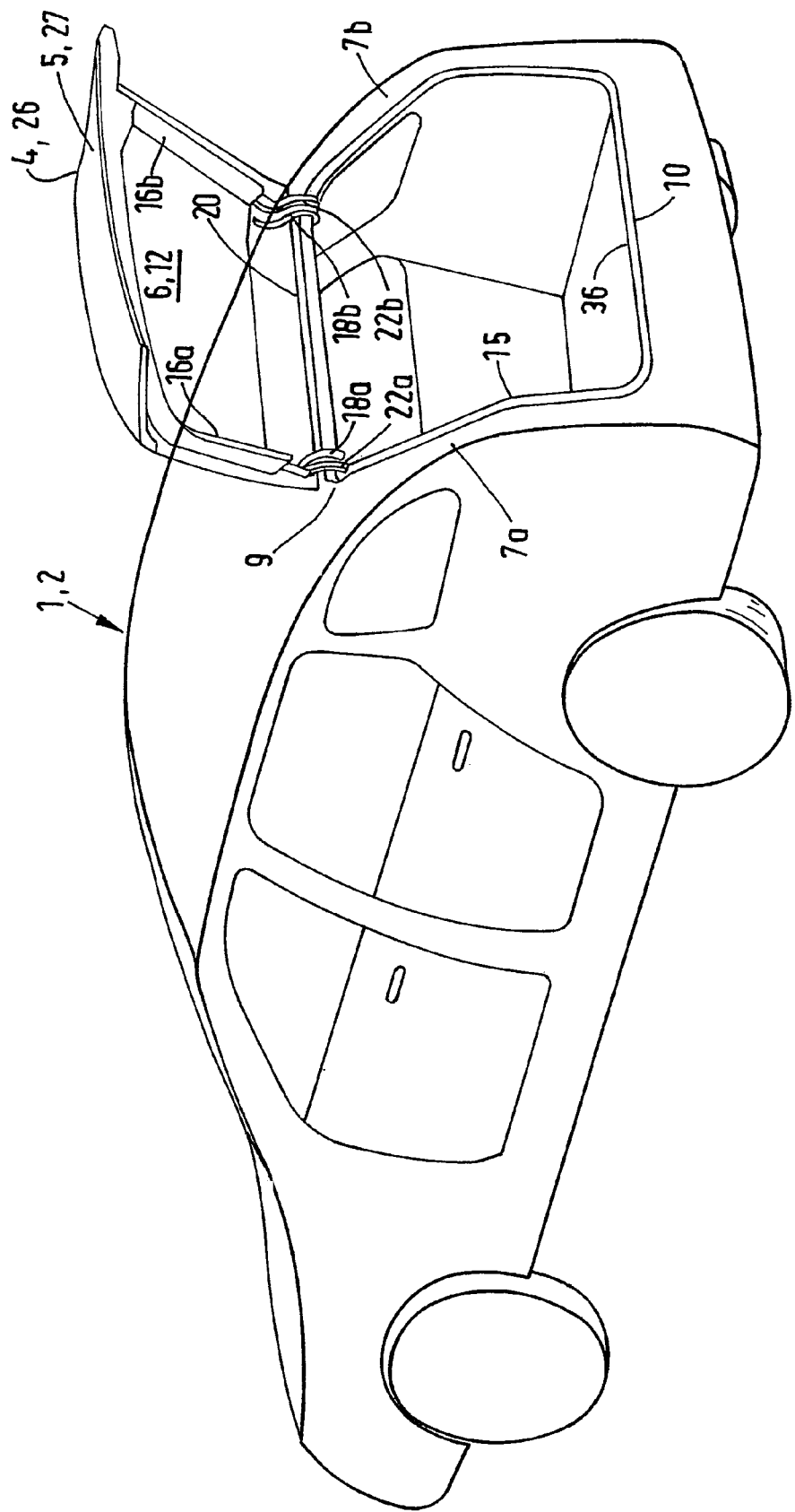
FIG. 5 shows a perspective view of the motor vehicle, which is shown in FIG. 4, and in which the tailgate is in an opened position with a closed rear window.

FIG. 5 shows a tailgate 4 in an opened position 26 in which the tailgate body 5 is in the opened position 27 and the rear window 6 is in the closed position 12. In FIG. 5, the encircling seal 15 can be seen.

Figure 6:
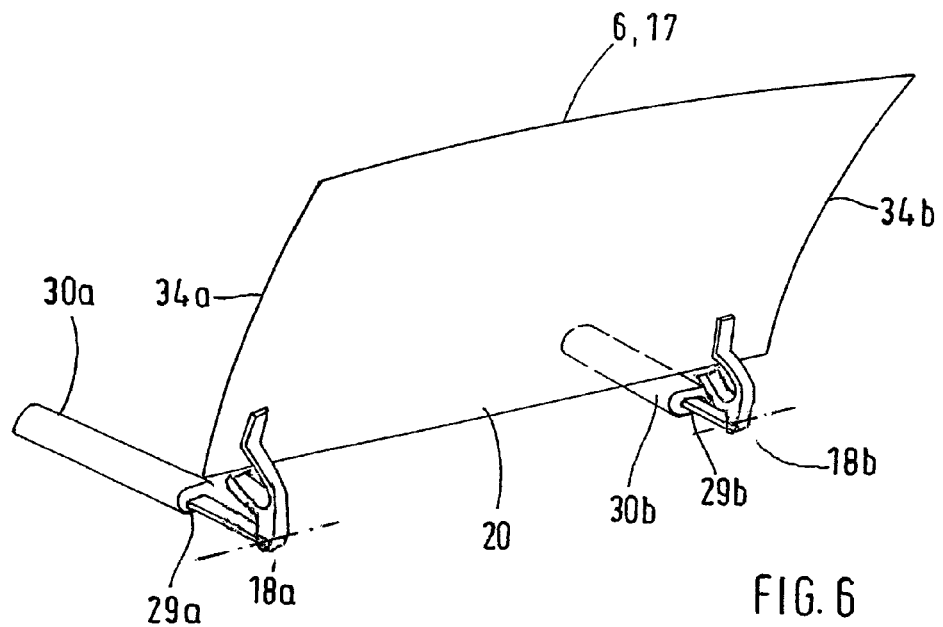
FIG. 6 shows a perspective view, as an individual component, of the rear window pane according to an embodiment of the invention and shown in FIG. 4.

In FIG. 6 the rear window pane 6 is shown formed as an individual component in the opened position 17 shown in FIG. 4. Each of the hinge drives 30a, 30b is represented by its respective end 29, which end faces towards the roof section 9.

Figure 7:
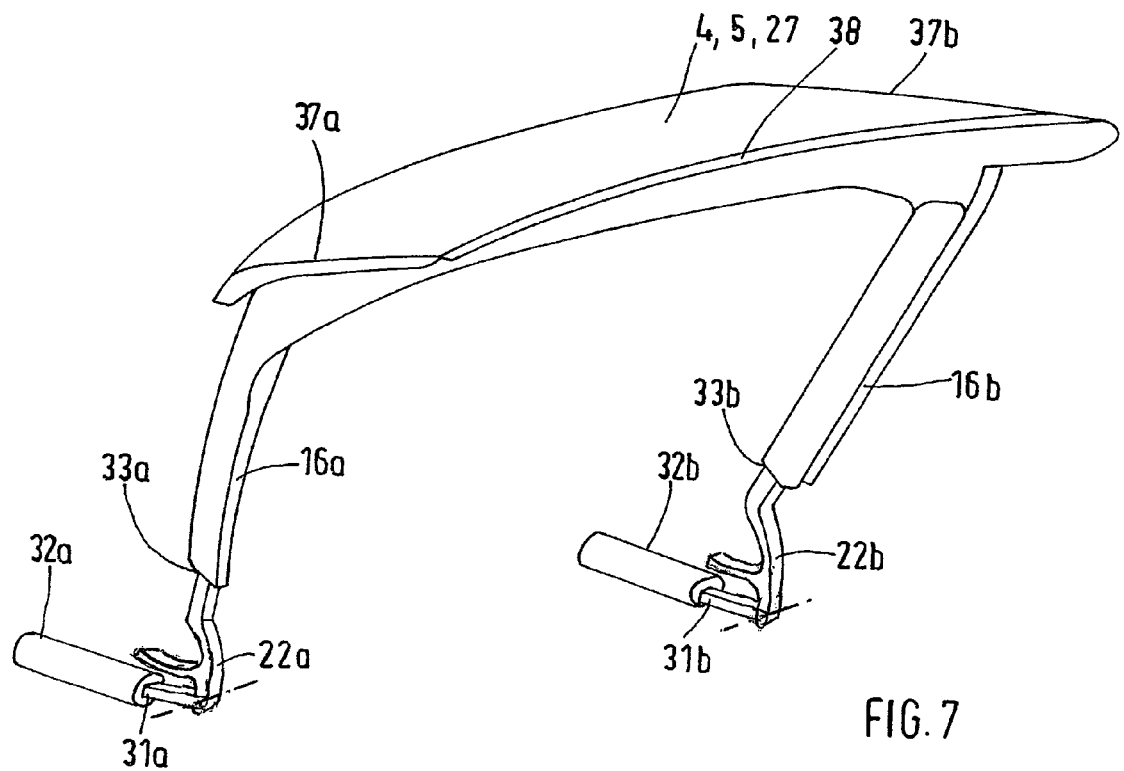
FIG. 7 shows a perspective view of a lower tailgate section, which is according to an embodiment of the invention and is in the open position shown in FIG. 5.

In FIG. 7 the tailgate body 5 is shown in an opened position 27 which corresponds to the representation in FIG. 5. Each of the hinge drives 32a, 32b is represented by its respective end 31 of its respective hinge arm 22a, 22b, which end faces towards the roof section 9.

Figure 8:
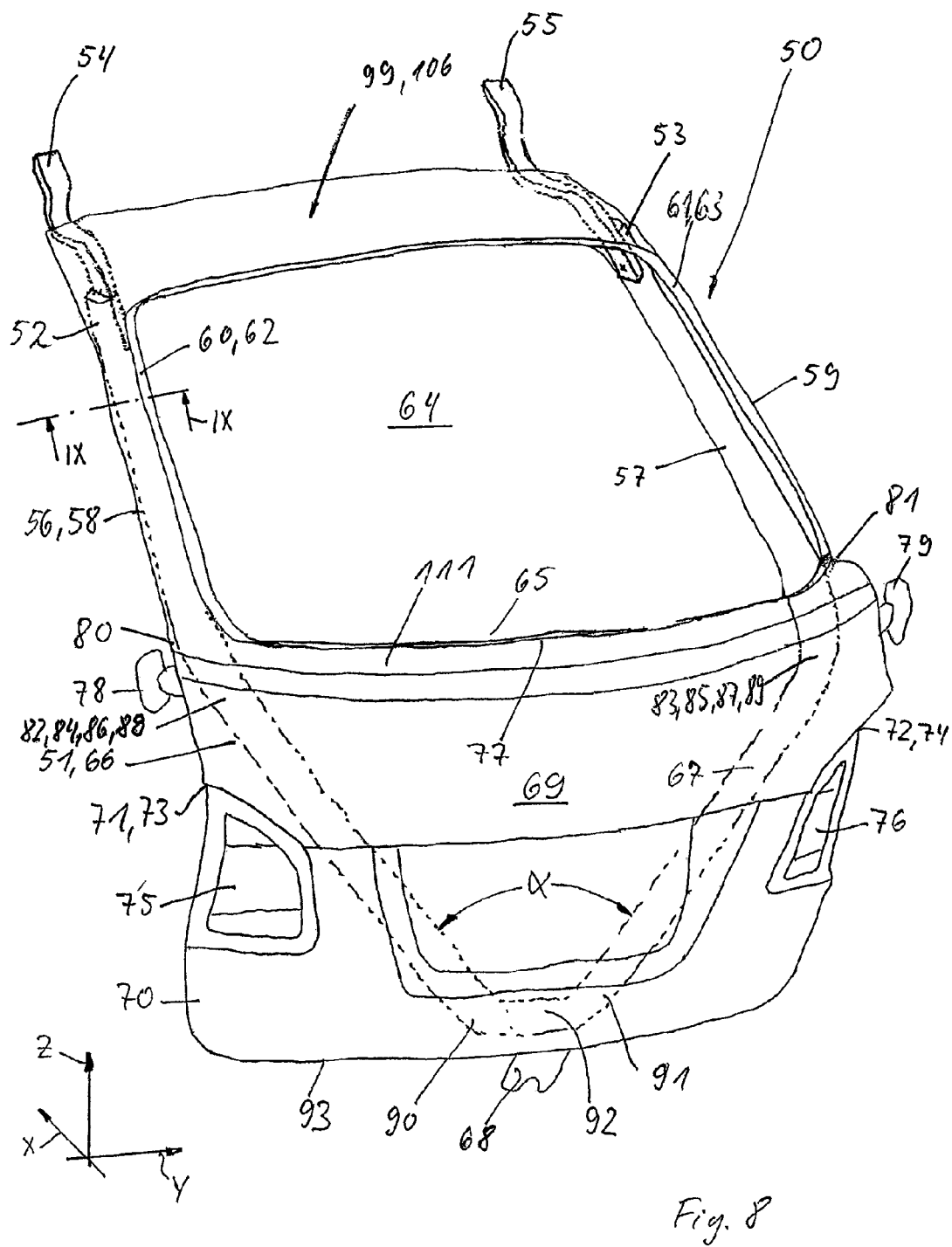
FIG. 8 shows a perspective view of a tailgate, which includes an open supporting frame, where the rear pane is disposed so as to be fixed on the tailgate.

FIG. 8 shows a tailgate 50 of a motor vehicle 1. The tailgate includes an open U-shaped supporting frame 51. The supporting frame 51 is fastened on a lower tailgate section or tailgate body 69 of the tailgate 50. Connecting to the tailgate body 69 is an upper tailgate section 99.

On each of the upper, free ends 52, 53 of the supporting frame 51, a hinge arm 54, 55 is fastened. The supporting frame 51 includes supporting frame sections 56, 57, which in the embodiment shown run parallel to the frame sections 58, 59 of the upper tailgate section 99. The frame sections 58, 59 of the upper tailgate section 99 are connected to one another via an upper transverse frame 106 and a lower transverse frame 111.

Connecting to the lateral edges 60, 61 of the frame sections 58, 59 are lateral edges 62, 63 of a rear window pane 64. In the embodiment of FIG. 8, the rear window pane 64 is fastened on the upper supporting frame sections 56, 57 of the supporting frame 51.

Figure 9:
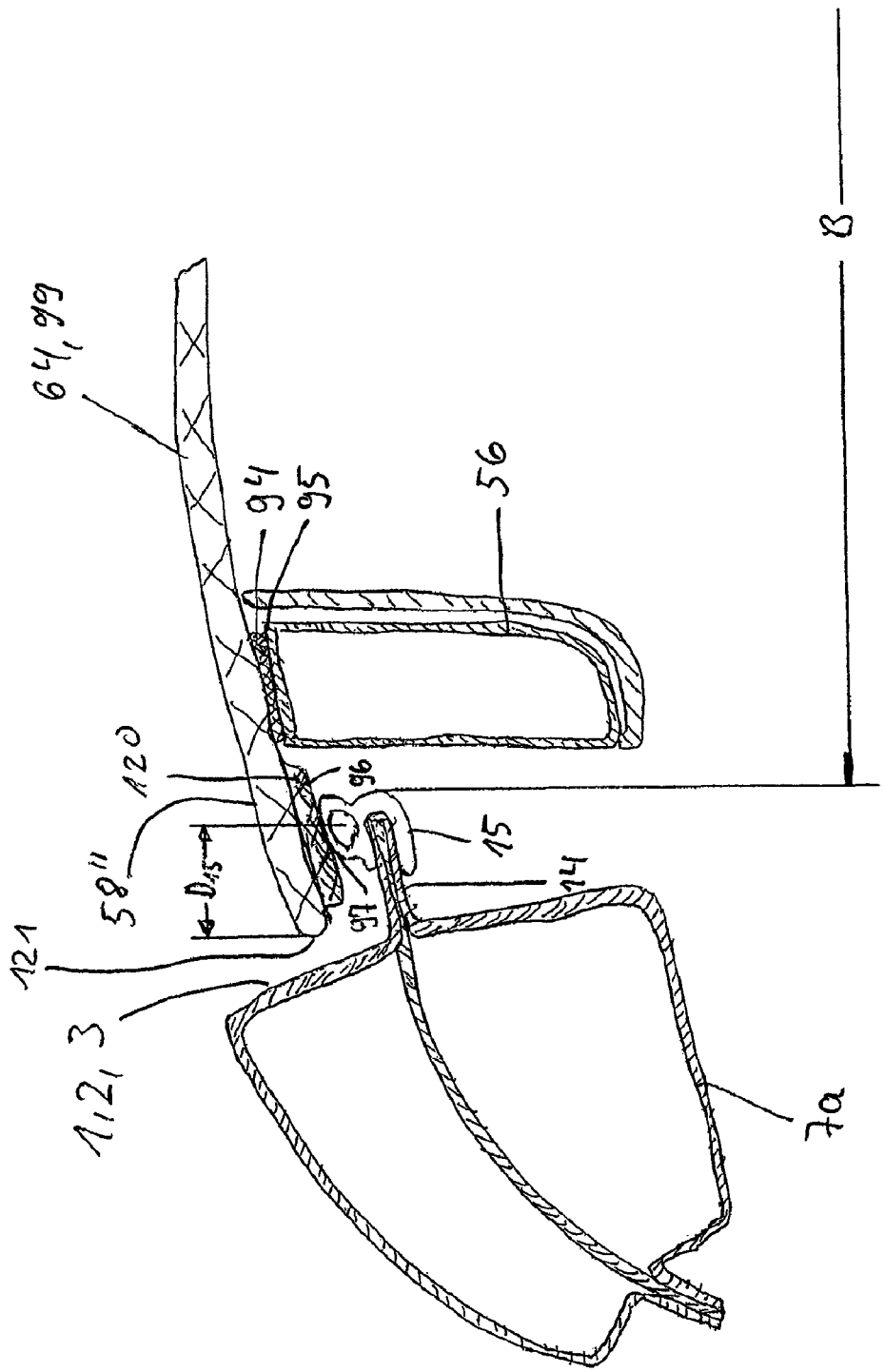
FIG. 9 shows a sectional view which runs at the level of the line IX-IX in FIG. 8 and in which in addition, not represented in FIG. 8, a body pillar of a motor vehicle is represented.

In another embodiment, the upper tailgate section 99, as is shown in FIG. 9, includes the rear window pane 64 without a frame. The rear window pane 64 is fastened directly on the upper supporting frame sections 56, 57 of the supporting frame 51.

At the level of a lower edge 65 of the rear window pane 64, which lower edge runs in the transverse direction y of the vehicle, lower supporting frame sections 66, 67 are attached as one piece to the upper supporting frame sections 56, 57. The lower supporting frame sections run together in a V-shape at an angle α at the level of a latch 68.

Connecting to the lower edge 65 of the rear window pane 64 is the tailgate body 69. In an outer skin 70 of the tailgate body 69, recesses 73, 74 are provided at opposite lateral edges 71, 72. The recesses serve to accommodate blinking light devices 75, 76 or the like.

At the level of an upper edge 77 of the tailgate body 69, a wedging device 78, 79 projects out over each of the respective lateral edges 71, 72 of the tailgate body 69.

In one embodiment, the respective wedging device 78, 79 is formed on the tailgate body 69 at a lower end 80, 81 of the respective frame section 58, 59 at the level of the lower edge 65 of the rear window pane 64.

In another embodiment, the wedging devices 78, 79 are formed directly on a corresponding area 82, 83 at the respective lower end 84, 85 of the upper supporting frame sections 56, 57 at the respective transition 86, 87 into the upper ends 88, 89 of the lower supporting frame sections 66, 67.

Each of the wedging devices 78, 79 engages in conforming hollows and/or recesses which are formed in the respective body pillar 7 of the tailgate opening 3 when the tailgate 50 is in the closed position 11.

At the lower ends 90, 91 of the lower supporting frame sections 66, 67 there is a connection of the lower supporting frame sections 66, 67 in a connecting area 92. The connecting area 92 is located above a lower edge 93 of the tailgate body 69. Below the connecting area 92 of the lower supporting frame sections 66, 67, the latch 68 is fastened on the lower edge 93 of the tailgate body 69.

In the closed state 11 of the tailgate 50 in the tailgate opening 3, bracing of the tailgate opening 3 is provided via the connection of the wedging devices 78, 79 to the respective body pillar 7 of the body 2 and the connection of the latch 68 to the lock formed in the trunk floor section 10.

FIG. 9 shows a sectional view similar to that of FIG. 3b with the difference that the rear window pane 64 is glued with an adhesive 94 on an upper side 95 of the respective upper supporting frame section 56, 57. The adhesive 94 is, for example, a glazing adhesive. On a lower side 96 of the respective lateral edge section 58", 59" of the rear pane 64, an injection-molded polyurethane coating 120 is provided. The injection-molded polyurethane coating 120 abuts a sealing surface 97 of the encircling seal 15.

Through the arrangement of the seal 15 on the lower side 96 of the respective edge section 58", 59" of the rear pane 64, the seal 15 can be relocated nearer to the tailgate opening 3 of the respective body pillar 7. The seal 15 can also be relocated in one construction nearer to the tailgate opening 3 of the respective body pillar 7 in which the rear window pane 64 is encircled by frame sections 58, 59, 106, and 111.

By the relocation of the seal 15 nearer to the tailgate opening 3 of the respective body pillar 7, the loading width B becomes larger than is possible in the state of the art shown in FIG. 3a. The increase of the loading width B of the tailgate opening 3 in one embodiment is in the range B=4 to 8 cm.

Figure 10:
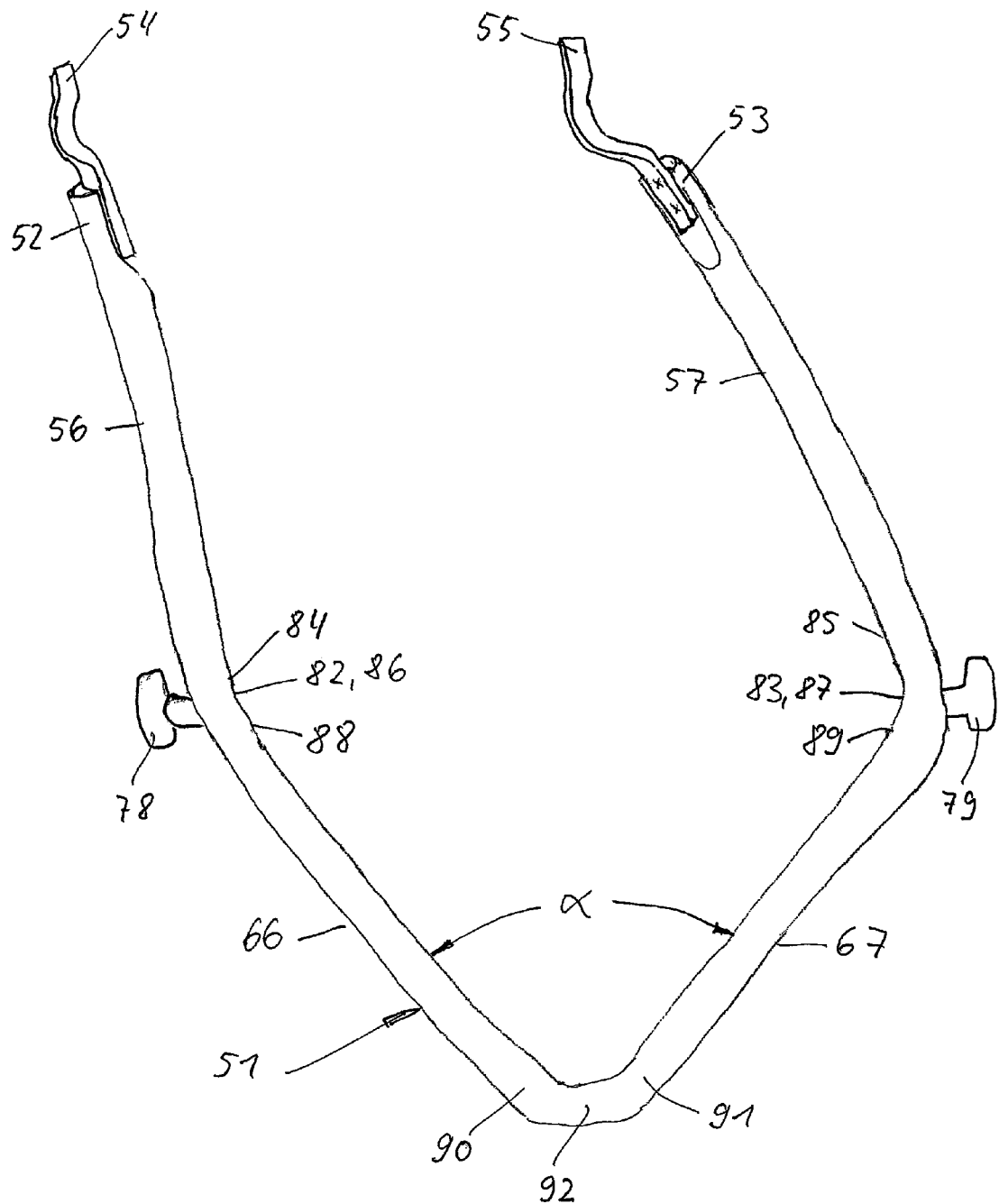
FIG. 10 shows a perspective view of a first form of the embodiment of the open supporting frame represented in FIG. 9.

FIG. 10 shows the form of a first embodiment of the supporting frame 51 with the hinge arms 54 and 55 disposed thereon as a single part. In addition, in the supporting frame 51, the wedging devices 78 and 79 in the transition 86 and 87 between the respective upper supporting frame section 56, 57 and the lower supporting frame section 66, 67 are represented.

The angle α between the lower supporting frame sections 66, 67 is from 70 to 110°. Furthermore, the supporting frame 51 in one embodiment has, in side view, a bending between the upper tailgate section 99 and the tailgate body 69. The bending runs in the area of the lower (transverse) edge 65 of the rear window pane 64 or the lower transverse frame 111 and the upper (transverse) edge 77 of the tailgate body 69 corresponding to the curve of the tailgate 50.

Figure 11:
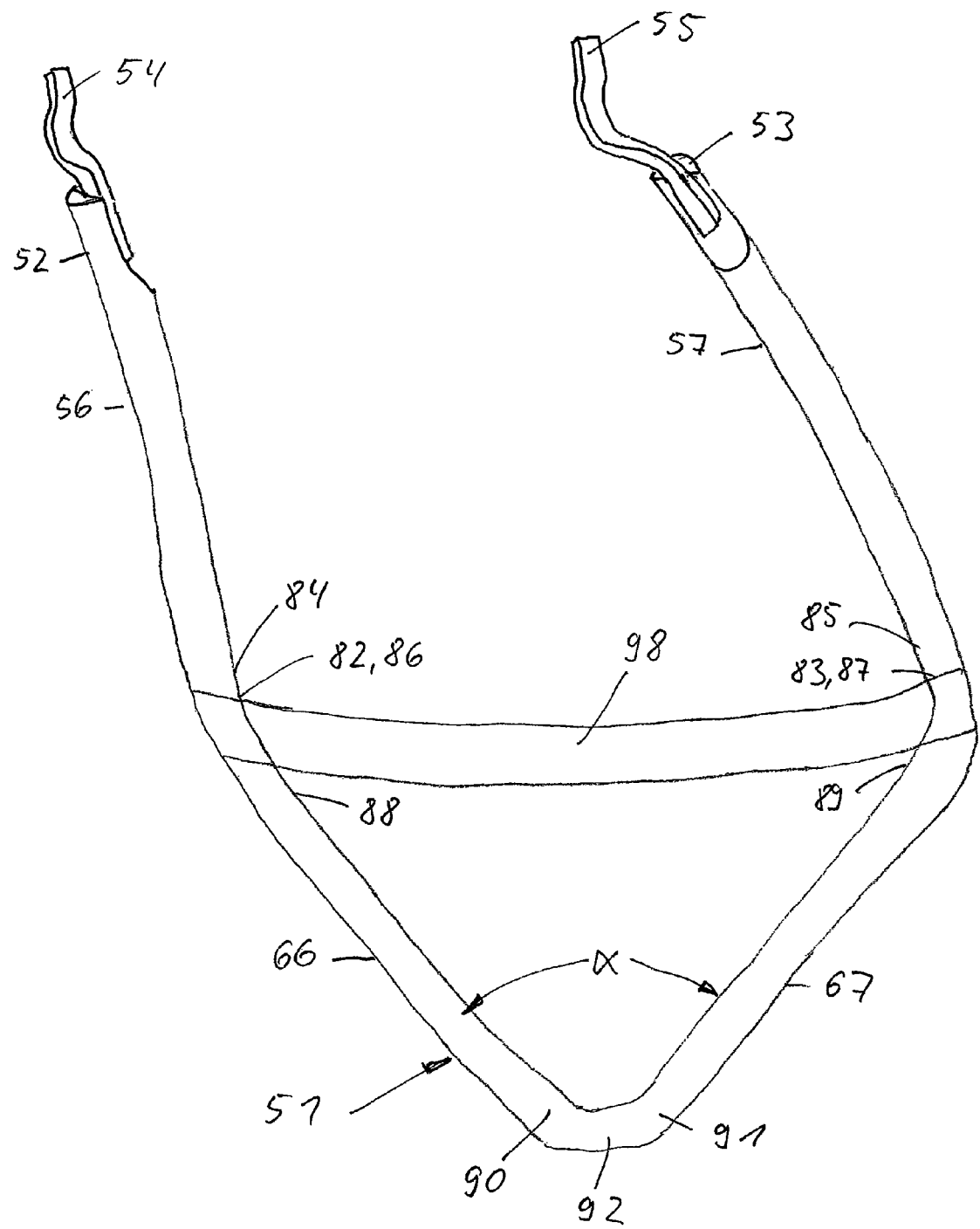
FIG. 11 shows a perspective view of a second form of the embodiment of the open supporting frame which is shown in FIG. 8 and in which in addition a transverse support section is provided at the level of a lower edge of the rear pane.

FIG. 11 shows a perspective view of the form of a second embodiment of a supporting frame 51, which is distinguished from the supporting frame 51 shown in FIG. 10 by the fact that additional transverse bracing is provided via a transverse supporting frame 98. In the embodiment shown, the transverse supporting frame 98 is fastened at the transitions 86 and 87.

Figure 12:
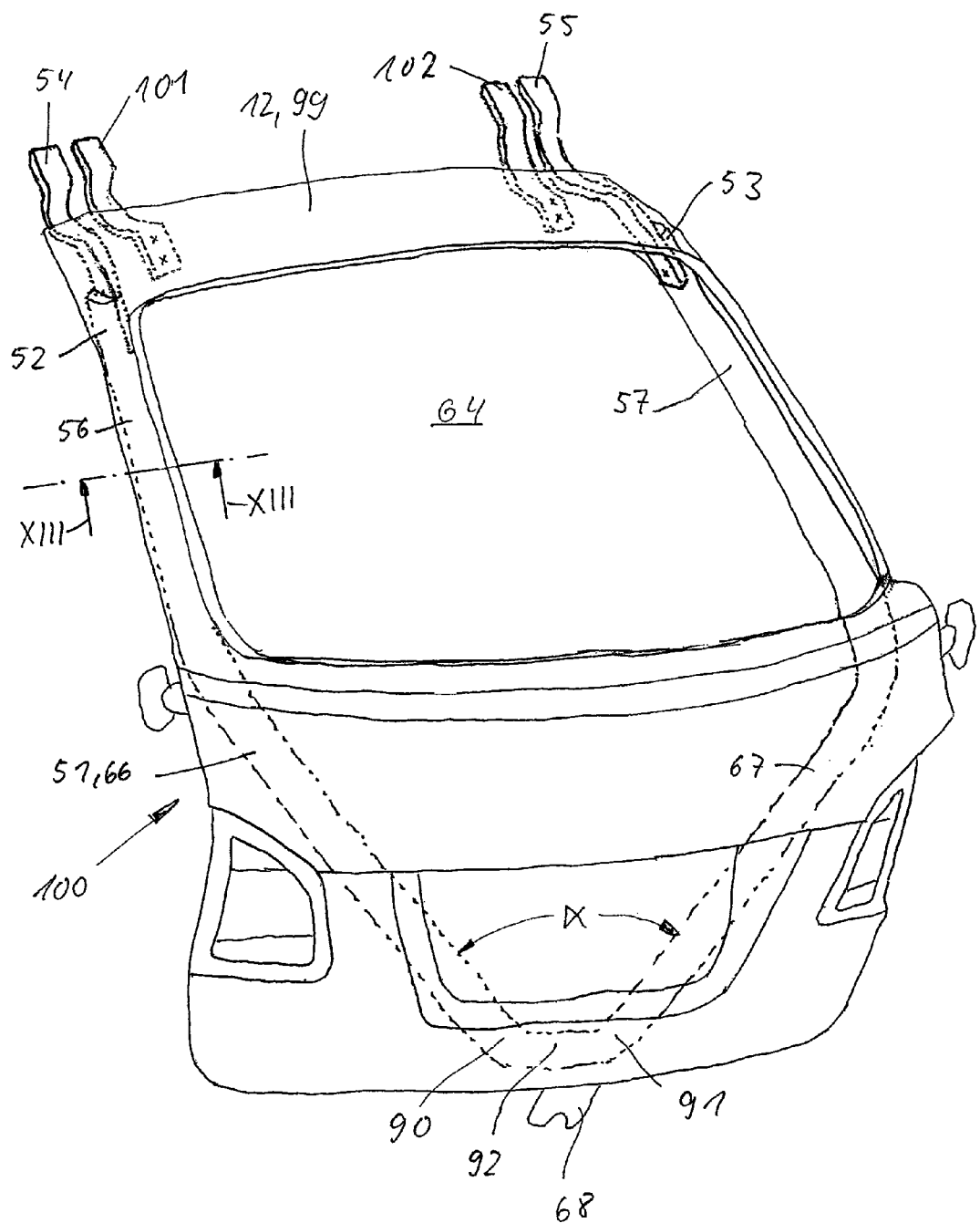
FIG. 12 shows a perspective view of a tailgate corresponding to FIG. 8, where the rear pane is disposed in such a manner that it can be pivoted on a not represented body via two hinges at a distance from one another.
Figure 13:
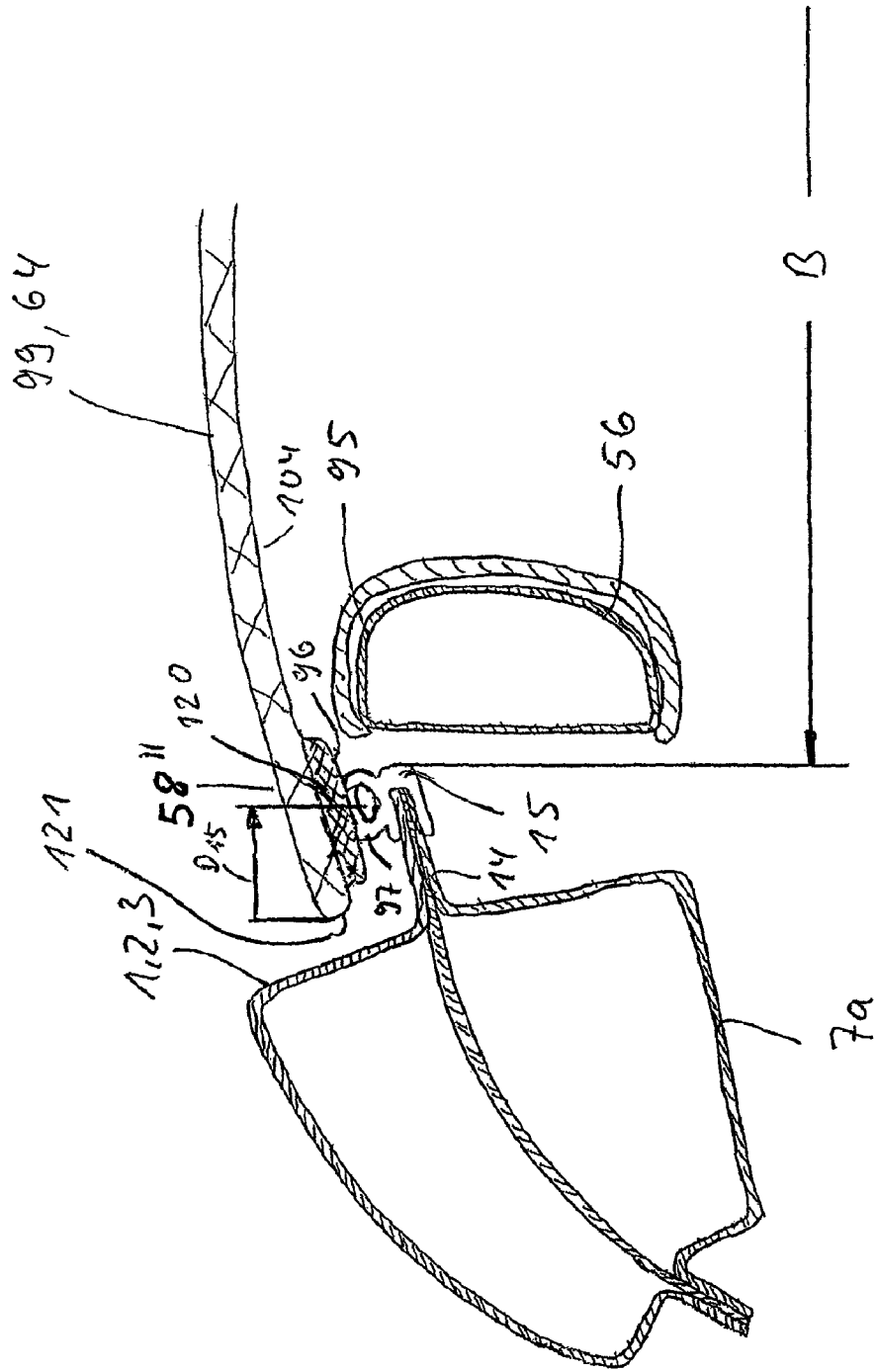
FIG. 13 shows a sectional view which, at the level of the line XIII-XIII in FIG. 12, runs through a body pillar not represented in FIG. 12, through a pivotable tailgate section, and through a lateral supporting frame section.

FIGS. 12 and 13 are distinguished from FIGS. 8 and 9 by the fact that a pivotable, upper tailgate section 99 is provided on a tailgate 100. The upper tailgate section 99 is mounted in such manner that it can be pivoted between the closed position 12 and the opened position 17 at the roof section 9 via hinge arms 101, 102.

In FIG. 12 the tailgate 100 is shown in which the upper tailgate section 99 with the rear window pane 64 disposed thereon is in the closed position 12.

FIG. 13 shows a side view similar to that of FIG. 3b. An inner surface 104 of the rear window pane 64 of the upper tailgate section 99 runs at a distance from an upper side 95 of the upper supporting frame section 56. The lower side 96 of the lateral edge section 58" of the rear window pane 64 abuts the sealing surface 97 of the encircling seal 15.

In another embodiment of the upper tailgate section 99, the rear window pane 64 is encircled by frame sections 58, 59, 106, and 111. Accordingly, in the closed position 12 of the upper tailgate section 99, the lateral and upper frame sections 58, 59 and 106 abut the seal 15.

Through the arrangement of the seal 15 opposite the lower side 96 of the respective frame section 58, 59, 106 or the respective frame section 58", 59", 106" the seal 15 can be relocated nearer to the tailgate opening 3 of the respective body pillar 7.

Due to this a spacing $D_{15}$ between the seal 15 and an end face 121 of the respective frame section 58, 59 of the upper tailgate section 99 or the respective frame section 58", 59" of the rear window pane 64 becomes smaller than in the state of the art.

Through this mode of construction, the loading width B becomes greater than is possible in the state of the art shown in FIG. 3a. The increase of the loading width B of the tailgate 3 in one form of embodiment is in the range: B=4 to 8 cm.

Figure 14:
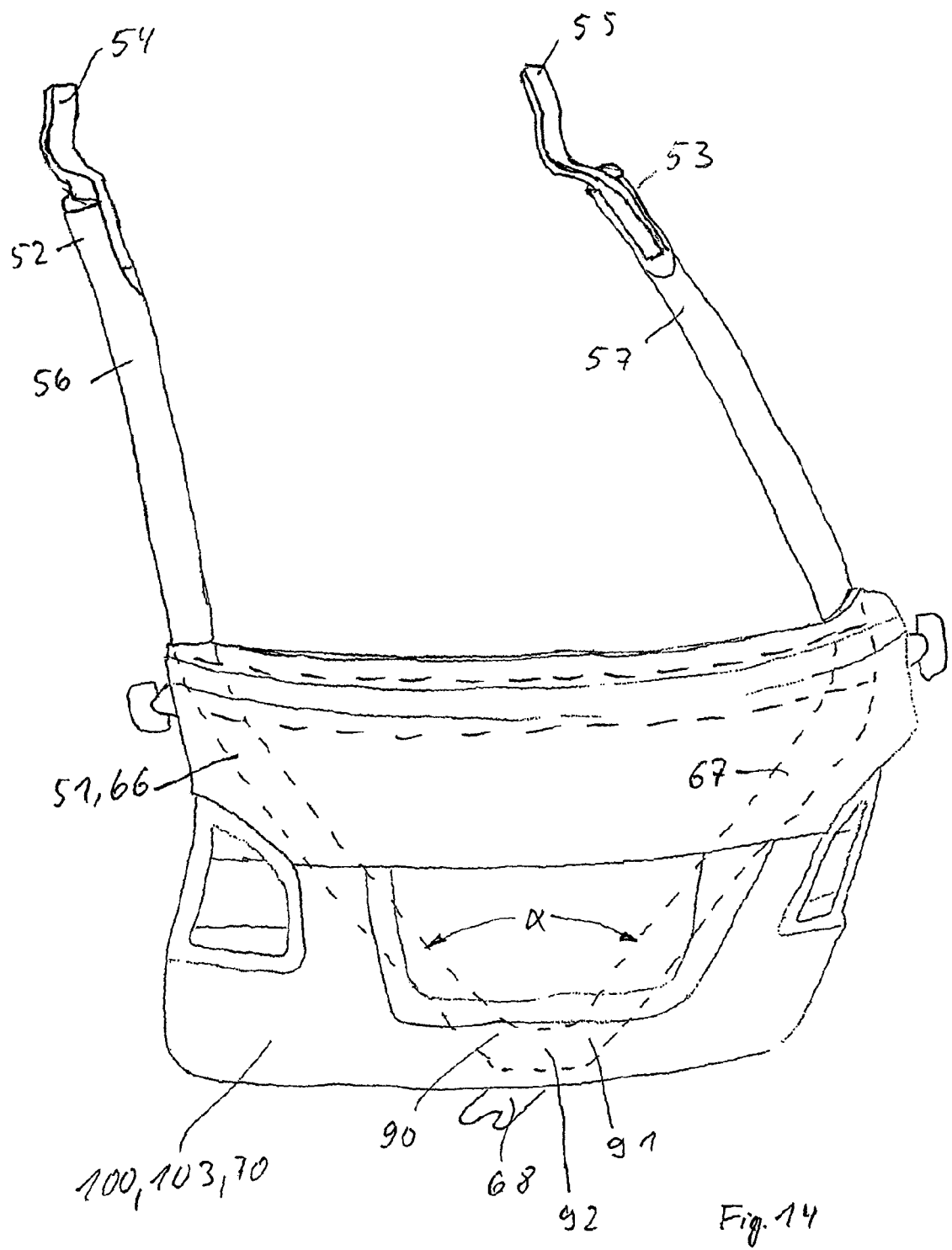
FIG. 14 is a perspective representation which shows a tailgate body in which the open supporting frame shown in FIG. 11 is disposed with the additional transverse frame.

In FIG. 14, a lower tailgate section or tailgate body 103 of the tailgate 100 is represented. On each of the upper, free ends 52, 53 of the supporting frame 51, a respective hinge arm 54, 55 is fastened. The supporting frame 51 includes upper supporting frame sections 56, 57 which run, in the embodiment shown, parallel to frame sections 58, 59 of the upper tailgate section 99. At the lateral edges 60, 61 of the frame sections 58, 59, lateral edges 62, 63 of the rear window pane 64 are disposed.

Figure 15:
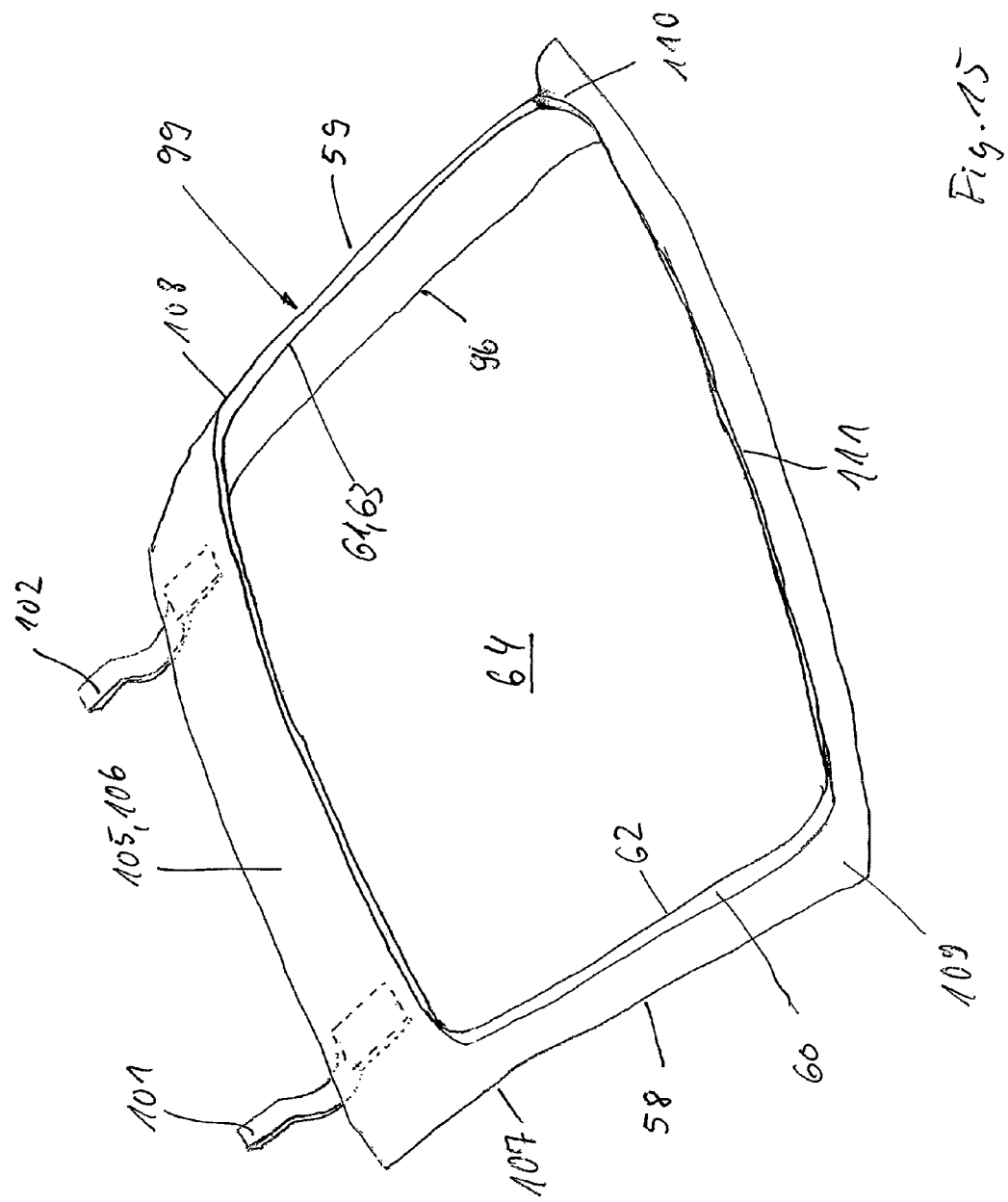
FIG. 15 is a perspective representation of the pivotable tailgate section which is shown in FIG. 12 and in which the rear pane is disposed.

In FIG. 15 an embodiment is represented in which the frame sections 58, 59 are parts of the upper tailgate section 99. The upper ends 107, 108 of the frame sections 58, 59 are connected to one another via the upper transverse frame 106. The lower ends 109, 110 of the frame sections 98, 59 are fastened on a lower transverse frame 111. On the upper transverse frame 106, two hinge arms 101, 102 are disposed at a distance from one another. The hinge arms are mounted on the roof section 9 of the body 2. The upper tailgate section 99 can be pivoted via the hinge arms 101, 102 from the closed position 12 into the opened position 17 and back.

From FIG. 15 an inner face 96 of a frame section 59 of the upper tailgate section 99 can be seen, with an upper side 95 of the upper supporting frame section 56 running at a distance from it. An outer skin 105 of the upper tailgate section 99 can be made of sheet metal or plastic, just like the outer skin 70 of the tailgate body 69, 103.

The supporting frame 51 can be formed as one piece from a profile. In one embodiment, the profile is closed and has, for example, a rectangular or annular cross section. The supporting frame 51 can, for example, be produced by an internal high-pressure forming process (IHF).

In another embodiment, the supporting frame 51 can be connected by several individual parts to one another to form a complete frame. In an additional embodiment, the open supporting frame 51 can be produced using the method of construction of sheet metal.

At the upper free ends 52, 53, the cross section or the profile is formed so that the hinge arms 54, 55 can be fastened. For example, the free ends 52, 53 can be flattened so that the profile is reduced.

An inner surface of the outer skin 70, said inner surface pointing towards an interior space of the vehicle in the closed state 11 of the tailgate 50, 100, includes in one embodiment reinforcing elements which, for example, are formed as ribs, webs, or profiles.

Figure 16:
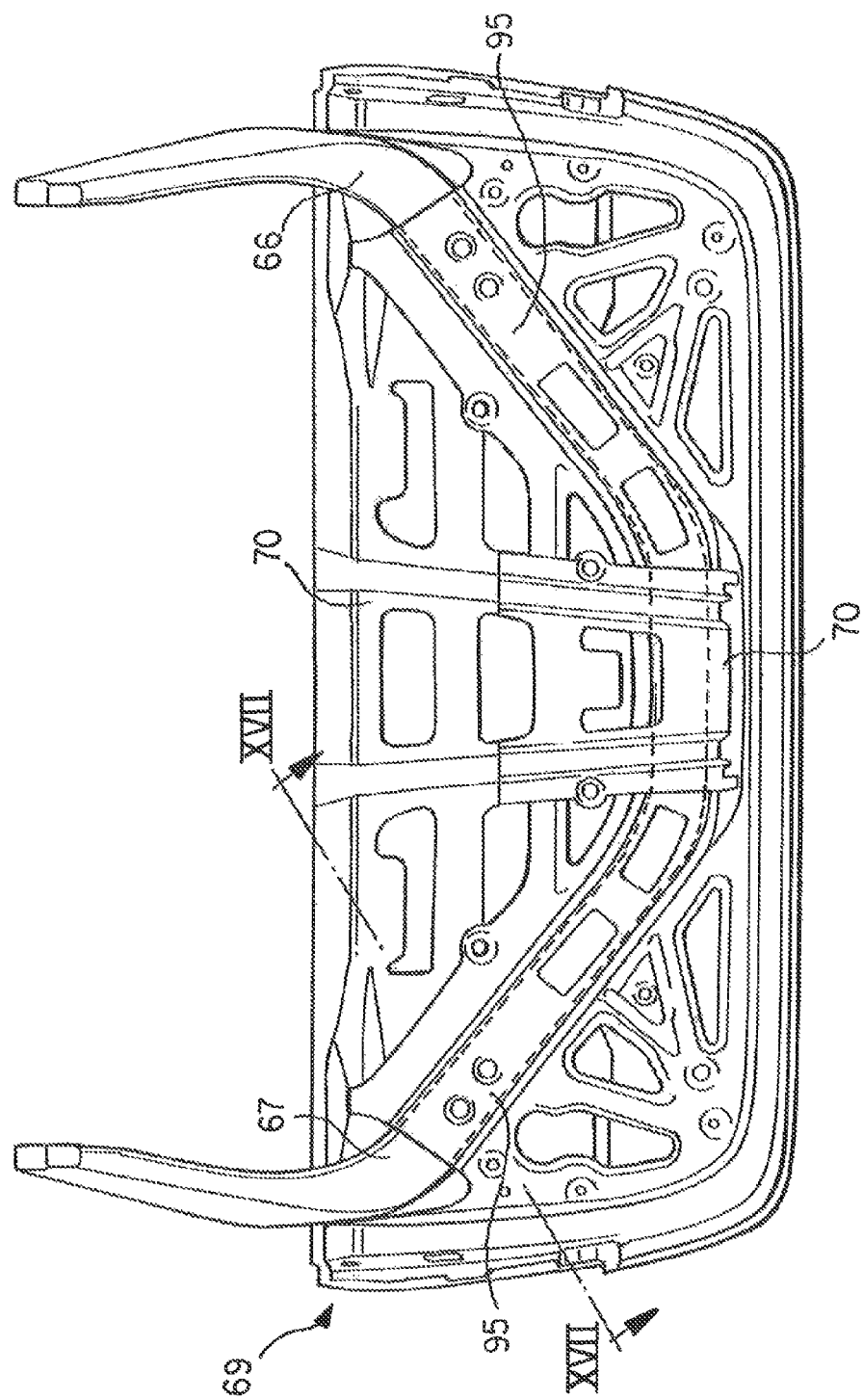
FIG. 16 is a perspective representation that shows the positioning of the guide profiles with respect to the lower supporting frame sections.
Figure 17:
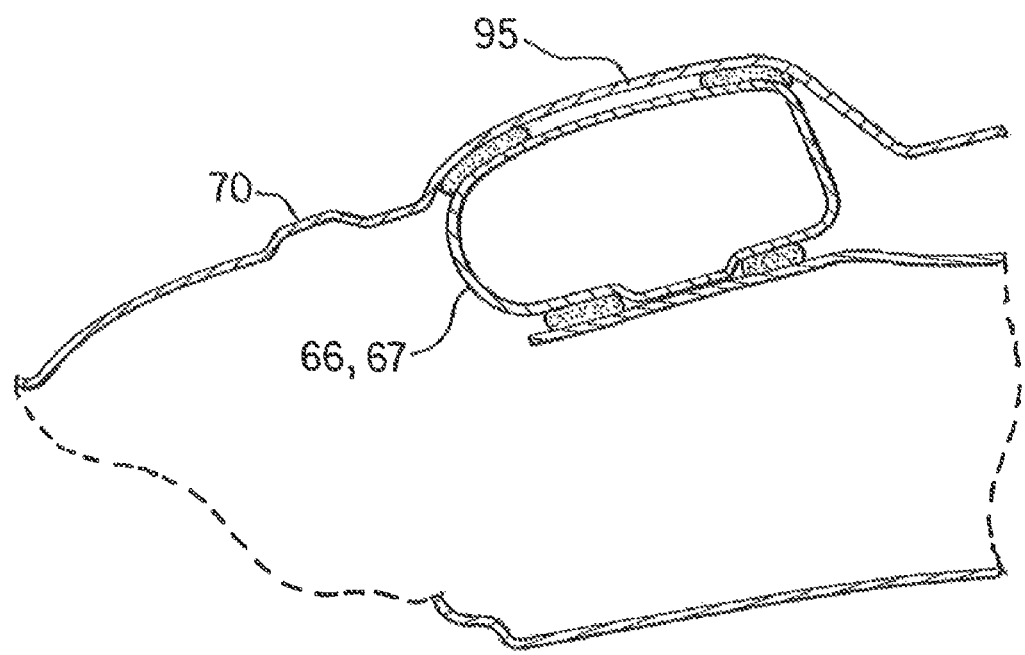
FIG. 17 is a sectional view along the line XVII-XVII in FIG. 16.

In one form of embodiment at the inner surface of the outer skin 70 of the tailgate body 69, 103, said inner surface pointing towards an interior space of the vehicle in the closed state 11 of the tailgate 50, 100, open guide profiles 95 are provided, which are formed by interior metal sheets, as shown in FIG. 16. The cross sections of the guide profiles are dimensioned so that the areas of the lower supporting frame sections 66, 67 are guided and held in the guide profiles 95. FIG. 17 is a sectional view along the line XVII-XVII in FIG. 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    a vehicle body;
    a tailgate opening formed in the vehicle body;
    a tailgate disposed in the tailgate opening so as to be pivotable on a roof section of the vehicle body, the tailgate including a tailgate body and an upper tailgate section having a rear window pane;
    pivot arms disposed as one piece on the tailgate body at a distance from one another;
    first hinge arms, each of which is provided at an upper end of a respective one of the pivot arms, mounted in a roof section of the vehicle body, and directly affixed to the respective pivot arm, wherein the first hinge arms allow the pivoting of the tailgate; and
    a single encircling seal disposed at the tailgate opening for sealing between the upper tailgate section, the tailgate body and the tailgate opening without additional sealing of the pivot arms being required.

2. The motor vehicle according to claim 1, wherein the upper tailgate section is fastened on, or disposed to be pivotable with respect to, the tailgate body.

3. The motor vehicle according to claim 2, further comprising second hinge arms located at a distance from one another, the second hinge arms allowing the pivoting of the upper tailgate section in an area of the roof section.

4. The motor vehicle according to claim 1, wherein the single encircling seal abuts an upper edge section of a rear window pane and lateral edge sections of the rear window pane in a closed state of the tailgate.

5. The motor vehicle according to claim 4, wherein a lower area of the single encircling seal abuts lateral edge sections and a lower edge section of the tailgate body, said lower edge section of the tailgate body extending approximately horizontally in a transverse direction of the vehicle.

6. The motor vehicle according to claim 1, further comprising a seal disposed on an upper edge section of the tailgate body and extending approximately horizontally in a transverse direction of the motor vehicle, the seal being configured to seal a lower edge section of the rear window pane.

7. The motor vehicle according to claim 1, wherein the pivot arms located at a distance from one another form upper supporting frame sections of an open supporting frame.

8. The motor vehicle according to claim 7, further comprising lower supporting frame sections of the open supporting frame, said lower supporting frame sections connecting to the upper supporting frame sections, wherein the lower supporting frame sections extend obliquely with respect to one another and are connected to one another.

9. The motor vehicle according to claim 8, wherein the open supporting frame is a single unitary part.

10. The motor vehicle according to claim 8, wherein the open supporting frame is formed of multiple parts.

11. The motor vehicle according to claim 8, wherein the open supporting frame is an internal high-pressure process formed open supporting frame.

12. The motor vehicle according to claim 8, wherein the open supporting frame is a sheet metal constructed open supporting frame.

13. The motor vehicle according to claim 8, further comprising a transverse support frame disposedly connected at each end in a transition area in which a lower end of the upper supporting frame sections are connected to an upper end of the lower supporting frame sections, respectively.

14. The motor vehicle according to claim 13, wherein the transverse support frame is disposed below a lower edge of the rear window pane in an upper area of the tailgate body.

15. The motor vehicle according to claim 13, wherein the transverse support frame forms a closed frame in a triangle shape with the lateral lower supporting frame sections of the open supporting frame.

16. The motor vehicle according to claim 13, further comprising wedging devices, one wedging device being respectively arranged at one of each transition area of the open supporting frame and each lateral edge of the tailgate body.

17. The motor vehicle according to claim 16, wherein in a closed state of the tailgate, each wedging device engages with a receiving device formed on an opposing body pillar of the motor vehicle.

18. The motor vehicle according to claim 1, wherein the tailgate body comprises an inner skin together with an outer skin.

19. The motor vehicle according to claim 18, further comprising holding mechanisms for holding the lower supporting frame sections, said holding mechanisms being operatively configured on at least one of the outer skin and the inner skin.

20. The motor vehicle according to claim 18, wherein the holding mechanism comprises a guide profile in which the respective lower supporting frame section is disposed.

21. The motor vehicle according to claim 8, wherein a connecting area of the lower supporting frame sections is disposed at a lower edge of the tailgate body.

22. The motor vehicle according to claim 21, further comprising a latch arranged in the connecting area of the lower supporting frame sections to transmit force via the latch into the lower supporting frame sections.

23. The motor vehicle according to claim 16, wherein in the closed state of the tailgate, the tailgate opening is reinforced by a form-locking connection of the wedging devices and a latch arranged in a connecting area of the lower supporting frame sections.

24. The motor vehicle according to claim 1, wherein the upper tailgate section comprises one of a rear window pane encircled by a frame and a frameless rear window pane.

25. The motor vehicle according to claim 24, wherein upper ends of lateral frame sections of the upper tailgate section are connected to one another via an upper transverse frame, and wherein lower ends of the lateral frame sections are connected to one another via a lower transverse frame.

26. The motor vehicle according to claim 25, further comprising two second hinge arms fastened, respectively, at a distance from one another on the upper transverse frame, said two second hinge arms being mounted on the roof section of the vehicle body.

27. The motor vehicle according to claim 26, wherein the upper tailgate section is pivotable via said two second hinge arms from a closed position into an opened position and back.

28. The motor vehicle according to claim 8, wherein the upper supporting frame sections of the open supporting frame extend adjacent to an inner surface of lateral edges of the upper tailgate section.

29. The motor vehicle according to claim 8, wherein the upper supporting frame sections of the open supporting frame are fastened on an inner surface of lateral edges of the upper tailgate section via an adhesive.

* * * * *